United States Patent
Ward et al.

(10) Patent No.: US 10,526,553 B2
(45) Date of Patent: Jan. 7, 2020

(54) METHOD FOR CRACKING A HYDROCARBON FEEDSTOCK IN A STEAM CRACKER UNIT

(71) Applicants: SAUDI BASIC INDUSTRIES CORPORATION, Riyadh (SA); SABIC GLOBAL TECHNOLOGIES B.V., Bergen op Zoom (NL)

(72) Inventors: Andrew Mark Ward, Wilton Centre (GB); Thomas Hubertus Maria Housmans, Geleen (NL); Arno Johannes Maria Oprins, Maastricht (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/901,921

(22) PCT Filed: Jun. 30, 2014

(86) PCT No.: PCT/EP2014/063848
§ 371 (c)(1),
(2) Date: Dec. 29, 2015

(87) PCT Pub. No.: WO2015/000840
PCT Pub. Date: Jan. 8, 2015

(65) Prior Publication Data
US 2016/0369191 A1 Dec. 22, 2016

(30) Foreign Application Priority Data

Jul. 2, 2013 (EP) .................................. 13174781

(51) Int. Cl.
*C10G 69/06* (2006.01)
*C10G 67/04* (2006.01)
*C10G 69/00* (2006.01)

(52) U.S. Cl.
CPC ......... *C10G 69/06* (2013.01); *C10G 67/0445* (2013.01); *C10G 69/00* (2013.01);
(Continued)

(58) Field of Classification Search
CPC ...... C10G 9/00; C10G 67/00; C10G 67/0445; C10G 69/00; C10G 69/06;
(Continued)

(56) References Cited

U.S. PATENT DOCUMENTS 3,023,158 A * 2/1962 Watkins ................. C10G 69/00
208/110
3,172,834 A * 3/1965 Kozlowski ............... C10L 1/06
208/111.25

(Continued)

FOREIGN PATENT DOCUMENTS

DE 2708412 A1 12/1977
EP 0023802 A1 2/1981
(Continued)

OTHER PUBLICATIONS

Froment et al., "Selectivities and yields in cocracking ethane and propane," *The Oil and Gas Journal*, 1979; 77(16): 87-90.
(Continued)

*Primary Examiner* — Prem C Singh
*Assistant Examiner* — Brandi M Doyle
(74) *Attorney, Agent, or Firm* — Norton Rose Fulbright US LLP (57) ABSTRACT

The present invention relates to a process for cracking a hydrocarbon feedstock in a steam cracker unit, comprising the following steps of: feeding a liquid hydrocarbon feed-
(Continued)

stock to a hydrocracking unit, separating the stream thus hydrocracked in said hydrocracking unit into a high content aromatics stream and a gaseous stream comprising C2-C4 paraffins, hydrogen and methane, separating C2-C4 paraffins from said gaseous stream, feeding said C2-C4 paraffins thus separated to the furnace section of a steam cracker unit.

2 Claims, 1 Drawing Sheet (52) U.S. Cl.
CPC ............... C10G 2300/1044 (2013.01); C10G 2300/1051 (2013.01); C10G 2300/1055 (2013.01); C10G 2300/1059 (2013.01); C10G 2300/1085 (2013.01); C10G 2400/20 (2013.01); C10G 2400/30 (2013.01); Y02P 30/40 (2015.11)

(58) Field of Classification Search
CPC .... C10G 2300/1044; C10G 2300/1051; C10G 2300/1055; C10G 2300/1059; C10G 2300/1085; C10G 2400/20; C10G 2400/30; C10G 69/02; C10G 69/04; C10G 67/02
See application file for complete search history.

(56) References Cited

U.S. PATENT DOCUMENTS

| | | | |
|---|---|---|---|
| 3,256,176 A | | 6/1966 | Mills et al. |
| 3,842,138 A | | 10/1974 | Chahvekilian et al. |
| 3,944,481 A | | 3/1976 | Wing et al. |
| 4,137,147 A | * | 1/1979 | Franck ................ B01J 29/20 208/61 |
| 4,492,624 A | * | 1/1985 | Johnson ................ C10G 9/14 208/130 |
| 4,789,457 A | | 12/1988 | Ficher et al. |
| 4,827,072 A | | 5/1989 | Imai et al. |
| 4,926,005 A | | 5/1990 | Olbrich et al. |
| 5,880,325 A | | 3/1999 | Alward et al. |
| 5,990,370 A | * | 11/1999 | Sims .................... C07C 4/04 585/302 |
| 6,153,087 A | | 11/2000 | Bigeard et al. |
| 6,270,654 B1 | | 8/2001 | Colyar et al. |
| 6,635,792 B2 | | 10/2003 | Choi et al. |
| 7,214,308 B2 | | 5/2007 | Colyar |
| 7,513,988 B2 | | 4/2009 | Oballa et al. |
| 7,622,623 B2 | | 11/2009 | Fridman et al. |
| 7,704,377 B2 | | 4/2010 | Duddy et al. |
| 7,938,952 B2 | | 5/2011 | Colyar et al. |
| 8,926,824 B2 | | 1/2015 | Morel |
| 9,005,430 B2 | | 4/2015 | Fournier et al. |
| 9,840,674 B2 | | 12/2017 | Weiss et al. |
| 2001/0052241 A1 | * | 12/2001 | Jain ................ F25J 3/0209 62/621 |
| 2002/0092797 A1 | * | 7/2002 | Choi ................ B01J 29/068 208/134 |
| 2006/0287561 A1 | * | 12/2006 | Choi ................ C10G 57/00 585/324 |
| 2008/0093262 A1 | | 4/2008 | Gragnani et al. |
| 2009/0173665 A1 | | 7/2009 | Zhou et al. |
| 2010/0048968 A1 | * | 2/2010 | Lauritzen ............ C07C 2/76 585/413 |
| 2014/0299515 A1 | | 10/2014 | Weiss et al. |
| 2016/0122666 A1 | | 5/2016 | Weiss et al. |

FOREIGN PATENT DOCUMENTS

| | | |
|---|---|---|
| EP | 0192059 A1 | 8/1986 |
| FR | 2364879 A1 | 4/1978 |
| GB | 1148967 | 4/1969 |
| GB | 1250615 A | 10/1971 |
| GB | 2162082 | 7/1985 |
| JP | S49-14721 | 2/1974 |
| JP | S52-95601 | 8/1977 |
| JP | S58-219130 | 12/1983 |
| JP | H06-79123 | 3/1994 |
| JP | 2003-277300 | 10/2003 |
| JP | 2007504292 | 3/2007 |
| JP | 2008-544061 | 12/2008 |
| JP | 2011213902 | 10/2011 |
| JP | 2011236282 | 11/2011 |
| WO | 2010102712 A2 | 6/2010 |
| WO | 2012135111 A2 | 10/2012 |
| WO | WO 2016/146326 | 9/2016 |

OTHER PUBLICATIONS

Alfke et al. (2007) Oil Refining, Ullmann's Encyclopedia of Industrial Chemistry.
English Abstract of WO2010102712(A2); Date of Publication: Sep. 19, 2010; 2 Pages.
Folkins (2000) Benzene, Ullmann's Encyclopedia of Industrial Chemistry.
International Search Report for International Application No. PCT/EP2014/063848; International Filing Date: Jun. 30, 2014; dated Sep. 1, 2014; 5 Pages.
International Search Report for International Application No. PCT/EP2014/063848; International Filing Date: Jun. 30, 2014; dated Sep. 1, 2014; 6 Pages.
Machine Translation of DE2708412(A1); Date of Publication: Dec. 15, 1977; 10 Pages.
Machine Translation of FR2364879; Date of Publication: Apr. 14, 1978; 26 Pages.
Table VI, p. 295, Pyrolysis: Theory and Industrial Practice by Lyle F. Albright et al., Academic Press 1983.
Office Action issued in corresponding Japanese Patent Application No. 2018-220049, dated Sep. 1, 2019.

* cited by examiner

METHOD FOR CRACKING A HYDROCARBON FEEDSTOCK IN A STEAM CRACKER UNIT

CROSS REFERENCE TO RELATED APPLICATIONS

This application is a National Stage application of PCT/EP2014/063848, filed Jun. 30, 2014, which claims the benefit of European Application No. 13174781.8, filed Jul. 2, 2013, both of which are incorporated by reference in their entirety herein.

The present invention relates to a process for cracking a hydrocarbon feedstock in a steam cracker unit.

Conventionally, crude oil is processed, via distillation, into a number of cuts such as naphtha, gas oils and residua. Each of these cuts has a number of potential uses such as for producing transportation fuels such as gasoline, diesel and kerosene or as feeds to some petrochemicals and other processing units.

Light crude oil cuts such a naphthas and some gas oils can be used for producing light olefins and single ring aromatic compounds via processes such as steam cracking in which the hydrocarbon feed stream is evaporated and diluted with steam then exposed to a very high temperature (800° C. to 860° C.) in short residence time (<1 second) furnace (reactor) tubes. In such a process the hydrocarbon molecules in the feed are transformed into (on average) shorter molecules and molecules with lower hydrogen to carbon ratios (such as olefins) when compared to the feed molecules. This process also generates hydrogen as a useful by-product and significant quantities of lower value co-products such as methane and C9+ Aromatics and condensed aromatic species (containing two or more aromatic rings which share edges).

Typically, the heavier (or higher boiling point), higher aromatic content streams, such as residua are further processed in a crude oil refinery to maximize the yields of lighter (distillable) products from the crude oil. This processing can be carried out by processes such as hydrocracking (whereby the hydro-cracker feed is exposed to a suitable catalyst under conditions which result in some fraction of the feed molecules being broken into shorter hydrocarbon molecules with the simultaneous addition of hydrogen). Heavy refinery stream hydrocracking is typically carried out at high pressures and temperatures and thus has a high capital cost.

An aspect of such a combination of crude oil distillation and steam cracking of the lighter distillation cuts is the capital and other costs associated with the fractional distillation of crude oil. Heavier crude oil cuts (i.e. those boiling beyond ~350° C.) are relatively rich in substituted aromatic species and especially substituted condensed aromatic species (containing two or more aromatic rings which share edges) and under steam cracking conditions these materials would yield substantial quantities of heavy by products such as C9+ aromatics and condensed aromatics. Hence, a consequence of the conventional combination of crude oil distillation and steam cracking is that a substantial fraction of the crude oil is not processed via the steam cracker as the cracking yield of valuable products from heavier cuts is not considered to be sufficiently high.

Another aspect of the technology discussed above is that even when only light crude oil cuts (such as naphtha) are processed via steam cracking a significant fraction of the feed stream is converted into low value heavy by-products such as C9+ aromatics and condensed aromatics. With typical naphthas and gas oils these heavy by-products might constitute 2% to 25% of the total product yield (Table VI, Page 295, Pyrolysis: Theory and Industrial Practice by Lyle F. Albright et al, Academic Press, 1983). Whilst this represents a significant financial downgrade of expensive naphtha in lower value material on the scale of a conventional steam the yield of these heavy by-products does not typically justify the capital investment required to up-grade these materials (e.g. by hydrocracking) into streams that might produce significant quantities of higher value chemicals. This is partly because hydrocracking plants have high capital costs and, as with most petrochemicals processes, the capital cost of these units typically scales with throughput raised to the power of 0.6 or 0.7. Consequently, the capital costs of a small scale hydro-cracking unit are normally considered to be too high to justify such an investment to process steam cracker heavy by-products.

Another aspect of the conventional hydrocracking of heavy refinery streams such as residua is that this is typically carried out under compromise conditions chosen to achieve the desired overall conversion. As the feed streams contain a mixture of species with a range of easiness of cracking this result in some fraction of the distillable products formed by hydrocracking of relatively easily hydrocracked species being further converted under the conditioned necessary to hydrocrack species more difficult to hydrocrack. This increases the hydrogen consumption and heat management difficulties associated with the process and also increases the yield of light molecules such as methane at the expense of more valuable species.

A feature of such a combination of crude oil distillation and steam cracking of the lighter distillation cuts is that steam cracking furnace tubes are typically unsuitable for the processing of cuts which contain significant quantities of material with a boiling point greater than ~350° C. as it is difficult to ensure complete evaporation of these cuts prior to exposing the mixed hydrocarbon and steam stream to the high temperatures required to promote thermal cracking. If droplets of liquid hydrocarbon are present in the hot sections of cracking tubes coke is rapidly deposited on the tube surface which reduces heat transfer and increases pressure drop and ultimately curtails the operation of the cracking tube necessitating a shut-down of the tube to allow for decoking. Due to this difficulty a significant proportion of the original crude oil cannot be processed into light olefins and aromatic species via a steam cracker.

US2009173665 relates to a catalyst and process for increasing the monoaromatics content of hydrocarbon feedstocks that include polynuclear aromatics, wherein the increase in monoaromatics can be achieved with an increase in gasoline/diesel yields and while reducing unwanted compounds thereby providing a route for upgrading hydrocarbons that include significant quantities of polynuclear aromatics.

FR 2 364 879 relates to a selective process for producing light olefinic hydrocarbons having 2 and 3 carbon atoms respectively per molecule, particularly ethylene and propylene, which are obtained by hydrogenolysis or hydrocracking followed with steam-cracking.

DE 2708412 relates to an integrated process for producing ethylene comprising a step of introducing a hydrocarbon feed stock in a hydrocracking reactor free of non-thermal hydrocracking catalyst under conditions of temperature in the range of from 510-815° C., a pressure in the range of from 15-70 atm and a residence time in the range of from 5-60 sec, a step of separating aromatic hydrocarbons, a step of separating a stream consisting essentially of hydrocarbons C2-C3 by cryogenic techniques; and introducing said stream into a cracking zone maintained under conditions for converting hydrocarbons in a stream mainly comprising ethylene.

U.S. Pat. No. 3,944,481 relates to a process for converting crude oil fractions into an olefin product by hydrocracking the crude oil fractions to C2-C5 paraffins and thermally cracking these to a C2-C3 olefin mixture, wherein hydrogen, methane, and the C6-C9 components are separated from the C2-C5 fraction and the C2-C5 fraction is then mixed with steam and injected into the thermal cracker.

EP 0023802 relates to a process for producing light paraffins which comprises hydrocracking a crude oil fraction boiling in the range 93° C. to 538° C. at a pressure above 2859 kPa, a temperature of 300 to 565° C., a hydrogen/hydrocarbon mole ratio of 4:1 to 50:1 and a residence time of 1 to 180 seconds over a catalyst, and recovering a C2-C5 alkane product, wherein said alkane product is thermally cracked to ethylene and propylene.

GB 1148967 relates to a process for the preparation of ethylene, comprising hydrocracking a hydrocarbon oil boiling below 250° C. at elevated temperature in the presence of hydrogen and a catalyst, separating a hydrocarbon mixture from the reaction product of the hydrocracking, thermally cracking this mixture at an elevated temperature in the presence of steam, and separating ethylene from the reaction product of the thermal cracking. The hydrocarbon mixture formed from the hydrocarbon oil as a result of the hydrocracking is present as a liquid in the gas/liquid separating system and is passed through a line to the steam cracking furnace.

GB 1250615 relates to an aromatic extraction process whereby aromatics can be extracted from aromatic-containing hydro crackates U.S. Pat. No. 3,842,138 relates to a method of thermal cracking in the presence of hydrogen of a charge of hydrocarbons of petroleum wherein the hydrocracking process is carried out under a pressure of 5 and 70 bars at the outlet of the reactor with very short residence times of 0.01 and 0.5 second and a temperature range at the outlet of the reactor extending from 625 to 1000° C. An object of the present invention is to provide a method for upgrading naphtha to aromatics and steam cracker feedstock comprising C2-C4 paraffins.

Another object of the present invention is to provide a method for converting relatively heavy liquid feeds, such as diesel and atmospheric gasoil to produce a hydrocracking product stream comprising mono-aromatic hydrocarbons and C2-C4 paraffins.

Another object of the present invention is to process a heavy liquid feedstock while minimizing the production of heavy C9+ byproducts.

The present invention relates to a process for cracking a hydrocarbon feedstock in a steam cracker unit, comprising the following steps of:

feeding a liquid hydrocarbon feedstock to a hydrocracking unit, separating the stream thus hydrocracked in said hydrocracking unit into a high content aromatics stream and a gaseous stream comprising C2-C4 paraffins, hydrogen and methane, separating C2-C4 paraffins from said gaseous stream, feeding said C2-C4 paraffins thus separated to the furnace section of a steam cracker unit.

On basis of such a process one or more of the presents objects are achieved.

According to such a method the hydrocracked feedstock can be used as a feedstock for a steam cracker unit. The aromatics get separated from the gaseous stream and will not be sent to the steam cracker unit but will be further processed in a separate unit. Methane and other light components can be pretreated in a separator to separate C2-C4 paraffins from said gaseous stream and the C2-C4 paraffins be sent to a steam cracker unit. The typical gas produced in a steam cracker unit usually contains a lot of hydrogen often fueled to satisfy the energy demand of the steam cracker. This therefore will improve the energy performance and hydrogen balance.

Consequently the main aim of the present invention is to produce LPG (Ethane, propane, butanes), which can be processed in a gas steam cracker unit. By placing a suitably designed hydrocracker unit in front of a gas steam cracker, and feeding said hydrocracker unit with a liquid hydrocarbon feedstock, such as for instance naphtha, it effectively acts as a feed pretreatment unit to the gas steam cracker making an otherwise unsuitable feed suitable for processing in existing gas steam crackers. Potential feeds to be processed according to the present method could be hydrocarbon streams such as diesel, kerosene, atmospheric gasoils (AGO), gas condensates, naphtha and waxy materials.

According to the present invention the process for producing C2-C4 olefins and aromatic hydrocarbons having one aromatic ring comprises a step of contacting a liquid hydrocarbon feedstock having a boiling point in the range of 20-350° C. in the presence of hydrogen with a hydrocracking catalyst to produce a hydrocracking product stream comprising aromatic hydrocarbons having one aromatic ring and C2-C4 paraffins, a step of separating the aromatic hydrocarbons having one aromatic ring from the hydrocracking product stream; and a step of separating the C2-C4 paraffins from the hydrocracking product stream and preferably feeding said separated C2-C4 paraffins into dedicated pyrolysis furnaces to conduct a pyrolysis reaction to produce a pyrolysis product stream comprising C2-C4 olefins.

In preferred embodiments a portion of the hydrogen comprised in the pyrolysis product stream is separated and fed to the hydrocracking step, C5+ hydrocarbons comprised in the pyrolysis product stream are separated and are fed to the hydrocracking step, aromatic hydrocarbons having one aromatic ring are separated from the hydrocracking product stream using separator, e.g. a distillation process or a solvent extraction process, C2-C4 paraffins are separated from the hydrocracking product stream gaseous fraction using a separator, e.g. a distillation process.

According to other preferred embodiments one can pretreat the hydrocarbon feed (e.g. by solvent extraction) to separate the aromatics+naphtenes (extract) and the paraffins (raffinate). Consequently, one could process the aromatics+naphtenes stream via a hydrocracker (to do the HDS and remove any traces of paraffins and dehydrogenate the naphtenes to make sales specification aromatics) and send the paraffins to the steam cracker to make light olefins. This combination of processes will minimize the hydrogen consumption and minimize fuel gas make from the steam cracker unit.

As discussed above, the present process further comprises separating said high content aromatics stream into a stream of heavy aromatics and a stream high in mono-aromatics, especially using a separator of the distillation type.

According to another embodiment of the present invention the present process further comprises feeding the gaseous stream, i.e. predominantly comprising C2-C4 paraffins, to a dehydrogenation unit for obtaining hydrogen, C3-olefins and C4-olefins. This means that the gaseous stream produced in the hydrocracking unit can be sent to different routes, that is to the steam cracker unit or to the dehydrogenation unit. This choice of routes provides flexibility to the present method. Processes for the dehydrogenation of lower alkanes such as propane and butanes are described as lower alkane dehydrogenation process.

In a preferred embodiment the present process further comprises separating C2-C4 paraffins into individual streams, each stream predominantly comprising C2 paraffins, C3 paraffins and C4 paraffins, respectively, and feeding each individual stream to a specific furnace section of said steam cracker unit. This means that a C2 stream, which stream predominantly comprises C2 paraffins, is sent to a specific C2 furnace section of the steam cracker unit. The same holds for a C3 stream and a C4 stream. Such a separation into specific streams has a positive influence on the product yield of the steam cracker unit. In a preferred embodiment the C3 stream and the C4 stream, as separate streams or as a combined C3+C4 stream, are sent to a dehydrogenation unit. More in detail, the present method further comprises separating C2-C4 paraffins into individual streams, each stream predominantly comprising C2 paraffins, C3 paraffins and C4 paraffins, respectively, and feeding the predominantly comprising C2 paraffin stream to a steam cracker whilst feeding the predominantly comprising C3 paraffin stream to a propane dehydrogenation unit and feeding the predominantly comprising C4 paraffin stream to a butane dehydrogenation unit.

As discussed above, the gaseous stream produced in the hydrocracking unit contains a broad spectrum of hydrocracked products. In a preferred embodiment not only the C2-C4 paraffins will be recovered from the gaseous product but the other valuable components, such as hydrogen and methane as well. The hydrogen and methane containing stream will preferably be recycled to the hydrocracking unit. In addition, it is also preferred to have a purge stream in the hydrocracking unit to prevent accumulation of unwanted components.

The method for separating said C2-C4 paraffins from said gaseous stream is preferably carried out by a separation of the type chosen from cryogenic distillation or solvent extraction.

The preferred process conditions in said hydrocracking include a temperature of 300-550° C., a pressure of 300-5000 kPa gauge and a Weight Hourly Space Velocity of 0.1-10 h−1. More preferred hydrocracking conditions include a temperature of 350-550° C., a pressure of 600-3000 kPa gauge and a Weight Hourly Space Velocity of 0.2-2 h−1.

The reactor type design of the said hydrocracking unit is chosen from the group of the fixed bed type, ebulating bed reactor type and the slurry type, wherein the fixed bed type is preferred.

Examples of the hydrocarbon feedstock to said hydrocracking unit are of the type naphtha, kerosene, diesel, atmospheric gas oil (AGO), gas condensates, naphtha, waxes, or combinations thereof.

The separation of the high content aromatics stream is preferably of the distillation type.

According to a preferred embodiment the process according to the present invention further comprises separating C7 to C9 aromatics, for example toluene and xylene rich fraction, from the stream high in mono-aromatics, and converting said C7 to C9 aromatics into a benzene rich fraction.

Moreover, the process according to the present invention further comprises recovering a portion of hydrogen from the product stream of said steam cracker unit and feeding said hydrogen to said hydrocracking unit.

As discussed above, the present method further comprises recovering C5+ hydrocarbons from the product stream of said steam cracker unit and feeding said C5+ hydrocarbons to said hydrocracking unit.

The term "crude oil" as used herein refers to the petroleum extracted from geologic formations in its unrefined form. Any crude oil is suitable as the source material for the process of this invention, including Arabian Heavy, Arabian Light, other Gulf crudes, Brent, North Sea crudes, North and West African crudes, Indonesian, Chinese crudes and mixtures thereof, but also shale oil, tar sands and bio-based oils. The crude oil is preferably a conventional petroleum having an API gravity of more than 20° API as measured by the ASTM D287 standard. More preferably, the crude oil used is a light crude oil having an API gravity of more than 30° API. Most preferably, the crude oil comprises Arabian Light Crude Oil. Arabian Light Crude Oil typically has an API gravity of between 32-36° API and a sulfur content of between 1.5-4.5 wt-%.

The term "petrochemicals" or "petrochemical products" as used herein relates to chemical products derived from crude oil that are not used as fuels. Petrochemical products include olefins and aromatics that are used as a basic feedstock for producing chemicals and polymers. High-value petrochemicals include olefins and aromatics. Typical high-value olefins include, but are not limited to, ethylene, propylene, butadiene, butylene-1, isobutylene, isoprene, cyclopentadiene and styrene. Typical high-value aromatics include, but are not limited to, benzene, toluene, xylene and ethyl benzene.

The term "fuels" as used herein relates to crude oil-derived products used as energy carrier. Unlike petrochemicals, which are a collection of well-defined compounds, fuels typically are complex mixtures of different hydrocarbon compounds. Fuels commonly produced by oil refineries include, but are not limited to, gasoline, jet fuel, diesel fuel, heavy fuel oil and petroleum coke.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The terms "naphthenic hydrocarbons" or "naphthenes" or "cycloalkanes" is used herein having its established meaning and accordingly relates types of alkanes that have one or more rings of carbon atoms in the chemical structure of their molecules. The term "olefin" is used herein having its well-established meaning. Accordingly, olefin relates to an unsaturated hydrocarbon compound containing at least one carbon-carbon double bond. Preferably, the term "olefins" relates to a mixture comprising two or more of ethylene, propylene, butadiene, butylene-1, isobutylene, isoprene and cyclopentadiene.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

The term "BTX" as used herein relates to a mixture of benzene, toluene and xylenes.

As used herein, the term "C# hydrocarbons", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C5+ hydrocarbons" is meant to describe a mixture of hydrocarbons having 5 or more carbon atoms. The term "C5+ alkanes" accordingly relates to alkanes having 5 or more carbon atoms.

As used herein, the term "hydrocracker unit" or "hydrocracker" relates to a refinery unit in which a hydrocracking process is performed i.e. a catalytic cracking process assisted by the presence of an elevated partial pressure of hydrogen; see e.g. Alfke et al. (2007) loc.cit. The products of this process are saturated hydrocarbons and, depending on the reaction conditions such as temperature, pressure and space velocity and catalyst activity, aromatic hydrocarbons including BTX. The process conditions used for hydrocracking generally includes a process temperature of 200-600° C., elevated pressures of 0.2-20 MPa, space velocities between 0.1-10 h−1

Hydrocracking reactions proceed through a bifunctional mechanism which requires a acid function, which provides for the cracking and isomerization and which provides breaking and/or rearrangement of the carbon-carbon bonds comprised in the hydrocarbon compounds comprised in the feed, and a hydrogenation function. Many catalysts used for the hydrocracking process are formed by composting various transition metals, or metal sulfides with the solid support such as alumina, silica, alumina-silica, magnesia and zeolites.

As used herein, the term "feed hydrocracking unit" or "FHC" refers to a refinery unit for performing a hydrocracking process suitable for converting a complex hydrocarbon feed that is relatively rich in naphthenic and paraffinic hydrocarbon compounds—such as straight run cuts including, but not limited to, naphtha- to LPG and alkanes. Preferably, the hydrocarbon feed that is subject to feed hydrocracking comprises naphtha. Accordingly, the main product produced by feed hydrocracking is LPG that is to be converted into olefins (i.e. to be used as a feed for the conversion of alkanes to olefins). The FHC process may be optimized to keep one aromatic ring intact of the aromatics comprised in the FHC feedstream, but to remove most of the side-chains from said aromatic ring. In such a case, the process conditions to be employed for FHC are comparable to the process conditions to be used in the GHC process as described herein above. Alternatively, the FHC process can be optimized to open the aromatic ring of the aromatic hydrocarbons comprised in the FHC feedstream. This can be achieved by modifying the GHC process as described herein by increasing the hydrogenation activity of the catalyst, optionally in combination with selecting a lower process temperature, optionally in combination with a reduced space velocity. In such a case, preferred feed hydrocracking conditions thus include a temperature of 300-550° C., a pressure of 300-5000 kPa gauge and a Weight Hourly Space Velocity of 0.1-10 h−1. More preferred feed hydrocracking conditions include a temperature of 300-450° C., a pressure of 300-5000 kPa gauge and a Weight Hourly Space Velocity of 0.1-10 h−1. Even more preferred FHC conditions optimized to the ring-opening of aromatic hydrocarbons include a temperature of 300-400° C., preferably a temperature of 350-450° C., more preferably 375-450° C., a pressure of 600-3000 kPa gauge and a Weight Hourly Space Velocity of 0.2-2 h−1.

The "aromatic ring opening unit" refers to a refinery unit wherein the aromatic ring opening process is performed. Aromatic ring opening is a specific hydrocracking process that is particularly suitable for converting a feed that is relatively rich in aromatic hydrocarbon having a boiling point in the kerosene and gasoil boiling point range to produce LPG and, depending on the process conditions, a light-distillate (ARO-derived gasoline). Such an aromatic ring opening process (ARO process) is for instance described in U.S. Pat. Nos. 3,256,176 and 4,789,457. Such processes may comprise of either a single fixed bed catalytic reactor or two such reactors in series together with one or more fractionation units to separate desired products from unconverted material and may also incorporate the ability to recycle unconverted material to one or both of the reactors. Reactors may be operated at a temperature of 200-600° C., preferably 300-400° C., a pressure of 3-35 MPa, preferably 5 to 20 MPa together with 5-20 wt-% of hydrogen (in relation to the hydrocarbon feedstock), wherein said hydrogen may flow co-current with the hydrocarbon feedstock or counter current to the direction of flow of the hydrocarbon feedstock, in the presence of a dual functional catalyst active for both hydrogenation-dehydrogenation and ring cleavage, wherein said aromatic ring saturation and ring cleavage may be performed. Catalysts used in such processes comprise one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica and zeolites. In this respect, it is to be noted that the term "supported on" as used herein includes any conventional way to provide a catalyst which combines one or more elements with a catalytic support. A further aromatic ring opening process (ARO process) is described in U.S. Pat. No. 7,513,988. Accordingly, the ARO process may comprise aromatic ring saturation at a temperature of 100-500° C., preferably 200-500° C. and more preferably 300-500° C., a pressure of 2-10 MPa together with 5-30 wt-%, preferably 10-30 wt-% of hydrogen (in relation to the hydrocarbon feedstock) in the presence of an aromatic hydrogenation catalyst and ring cleavage at a temperature of 200-600° C., preferably 300-400° C., a pressure of 1-12 MPa together with 5-20 wt-% of hydrogen (in relation to the hydrocarbon feedstock) in the presence of a ring cleavage catalyst, wherein said aromatic ring saturation and ring cleavage may be performed in one reactor or in two consecutive reactors. The aromatic hydrogenation catalyst may be a conventional hydrogenation/hydrotreating catalyst such as a catalyst comprising a mixture of Ni, W and Mo on a refractory support, typically alumina. The ring cleavage catalyst comprises a transition metal or metal sulphide component and a support. Preferably the catalyst comprises one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica and zeolites. By adapting either single or in combination the catalyst composition, operating temperature, operating space velocity and/or hydrogen partial pressure, the process can be steered towards full saturation and subsequent cleavage of all rings or towards keeping one aromatic ring unsaturated and subsequent cleavage of all but one ring. In the latter case, the ARO process produces a light-distillate ("ARO-gasoline") which is relatively rich in hydrocarbon compounds having one aromatic ring.

As used herein, the term "dearomatization unit" relates to a refinery unit for the separation of aromatic hydrocarbons, such as BTX, from a mixed hydrocarbon feed. Such dearomatization processes are described in Folkins (2000) Benzene, Ullmann's Encyclopedia of Industrial Chemistry. Accordingly, processes exist to separate a mixed hydrocarbon stream into a first stream that is enriched for aromatics and a second stream that is enriched for paraffins and naphthenes. A preferred method to separate aromatic hydrocarbons from a mixture of aromatic and aliphatic hydrocarbons is solvent extraction; see e.g. WO 2012135111 A2. The preferred solvents used in aromatic solvent extraction are sulfolane, tetraethylene glycol and N-methylpyrolidone which are commonly used solvents in commercial aromatics extraction processes. These species are often used in combination with other solvents or other chemicals (sometimes called co-solvents) such as water and/or alcohols. Non-nitrogen containing solvents such as sulfolane are particularly preferred. Commercially applied dearomatization processes are less preferred for the dearomatization of hydrocarbon mixtures having a boiling point range that exceeds 250° C., preferably 200° C., as the boiling point of the solvent used in such solvent extraction needs to be lower than the boiling point of the aromatic compounds to be extracted. Solvent extraction of heavy aromatics is described in the art; see e.g. U.S. Pat. No. 5,880,325. Alternatively, other known methods than solvent extraction, such as molecular sieve separation or separation based on boiling point, can be applied for the separation of heavy aromatics in a dearomatization process. A process to separate a mixed hydrocarbon stream into a stream comprising predominantly paraffins and a second stream comprising predominantly aromatics and naphthenes comprises processing said mixed hydrocarbon stream in a solvent extraction unit comprising three main hydrocarbon processing columns: solvent extraction column, stripper column and extract column. Conventional solvents selective for the extraction of aromatics are also selective for dissolving light naphthenic and to a lesser extent light paraffinic species hence the stream exiting the base of the solvent extraction column comprises solvent together with dissolved aromatic, naphthenic and light paraffinic species. The stream exiting the top of the solvent extraction column (often termed the raffinate stream) comprises the relatively insoluble, with respect to the chosen solvent) paraffinic species. The stream exiting the base of the solvent extraction column is then subjected, in a distillation column, to evaporative stripping in which species are separated on the basis of their relative volatility in the presence of the solvent. In the presence of a solvent, light paraffinic species have higher relative volatilities than naphthenic species and especially aromatic species with the same number of carbon atoms, hence the majority of light paraffinic species may be concentrated in the overhead stream from the evaporative stripping column. This stream may be combined with the raffinate stream from the solvent extraction column or collected as a separate light hydrocarbon stream. Due to their relatively low volatility the majority of the naphthenic and especially aromatic species are retained in the combined solvent and dissolved hydrocarbon stream exiting the base of this column. In the final hydrocarbon processing column of the extraction unit, the solvent is separated from the dissolved hydrocarbon species by distillation. In this step the solvent, which has a relatively high boiling point, is recovered as the base stream from the column whilst the dissolved hydrocarbons, comprising mainly aromatics and naphthenic species, are recovered as the vapour stream exiting the top of the column. This latter stream is often termed the extract.

The process of the present invention may require removal of sulfur from certain crude oil fractions to prevent catalyst deactivation in downstream refinery processes, such as catalytic reforming or fluid catalytic cracking. Such a hydrodesulfurization process is performed in a "HDS unit" or "hydrotreater"; see Alfke (2007) loc. cit. Generally, the hydrodesulfurization reaction takes place in a fixed-bed reactor at elevated temperatures of 200-425° C., preferably of 300-400° C. and elevated pressures of 1-20 MPa gauge, preferably 1-13 MPa gauge in the presence of a catalyst comprising elements selected from the group consisting of Ni, Mo, Co, W and Pt, with or without promoters, supported on alumina, wherein the catalyst is in a sulfide form.

In a further embodiment, the process further comprises a hydrodealkylation step wherein the BTX (or only the toluene and xylenes fraction of said BTX produced) is contacted with hydrogen under conditions suitable to produce a hydrodealkylation product stream comprising benzene and fuel gas.

The process step for producing benzene from BTX may include a step wherein the benzene comprised in the hydrocracking product stream is separated from the toluene and xylenes before hydrodealkylation. The advantage of this separation step is that the capacity of the hydrodealkylation reactor is increased. The benzene can be separated from the BTX stream by conventional distillation.

Processes for hydrodealkylation of hydrocarbon mixtures comprising C6-C9 aromatic hydrocarbons are well known in the art and include thermal hydrodealkylation and catalytic hydrodealkylation; see e.g. WO 2010/102712 A2. Catalytic hydrodealkylation is preferred as this hydrodealkylation process generally has a higher selectivity towards benzene than thermal hydrodealkylation. Preferably catalytic hydrodealkylation is employed, wherein the hydrodealkylation catalyst is selected from the group consisting of supported chromium oxide catalyst, supported molybdenum oxide catalyst, platinum on silica or alumina and platinum oxide on silica or alumina.

The process conditions useful for hydrodealkylation, also described herein as "hydrodealkylation conditions", can be easily determined by the person skilled in the art. The process conditions used for thermal hydrodealkylation are for instance described in DE 1668719 A1 and include a temperature of 600-800° C., a pressure of 3-10 MPa gauge and a reaction time of 15-45 seconds. The process conditions used for the preferred catalytic hydrodealkylation are described in WO 2010/102712 A2 and preferably include a temperature of 500-650° C., a pressure of 3.5-8 MPa gauge, preferably of 3.5-7 MPa gauge and a Weight Hourly Space Velocity of 0.5-2 h−1. The hydrodealkylation product stream is typically separated into a liquid stream (containing benzene and other aromatics species) and a gas stream (containing hydrogen, H2S, methane and other low boiling point hydrocarbons) by a combination of cooling and distillation. The liquid stream may be further separated, by distillation, into a benzene stream, a C7 to C9 aromatics stream and optionally a middle-distillate stream that is relatively rich in aromatics. The C7 to C9 aromatic stream may be fed back to reactor section as a recycle to increase overall conversion and benzene yield. The aromatic stream which contains polyaromatic species such as biphenyl, is preferably not recycled to the reactor but may be exported as a separate product stream and recycled to the integrated process as middle-distillate ("middle-distillate produced by hydrodealkylation"). The gas stream contains significant quantities of hydrogen may be recycled back the hydrodealkylation unit via a recycle gas compressor or to any other refinery that uses hydrogen as a feed. A recycle gas purge may be used to control the concentrations of methane and H2S in the reactor feed.

As used herein, the term "gas separation unit" relates to the refinery unit that separates different compounds comprised in the gases produced by the crude distillation unit and/or refinery unit-derived gases. Compounds that may be separated to separate streams in the gas separation unit comprise ethane, propane, butanes, hydrogen and fuel gas mainly comprising methane. Any conventional method suitable for the separation of said gases may be employed. Accordingly, the gases may be subjected to multiple compression stages wherein acid gases such as CO2 and H2S may be removed between compression stages. In a following step, the gases produced may be partially condensed over stages of a cascade refrigeration system to about where only the hydrogen remains in the gaseous phase. The different hydrocarbon compounds may subsequently be separated by distillation.

A process for the conversion of alkanes to olefins involves "steam cracking" or "pyrolysis". As used herein, the term "steam cracking" relates to a petrochemical process in which saturated hydrocarbons are broken down into smaller, often unsaturated, hydrocarbons such as ethylene and propylene. In steam cracking gaseous hydrocarbon feeds like ethane, propane and butanes, or mixtures thereof, (gas cracking) or liquid hydrocarbon feeds like naphtha or gasoil (liquid cracking) is diluted with steam and briefly heated in a furnace without the presence of oxygen. Typically, the reaction temperature is 750-900° C., but the reaction is only allowed to take place very briefly, usually with residence times of 50-1000 milliseconds. Preferably, a relatively low process pressure is to be selected of atmospheric up to 175 kPa gauge. Preferably, the hydrocarbon compounds ethane, propane and butanes are separately cracked in accordingly specialized furnaces to ensure cracking at optimal conditions. After the cracking temperature has been reached, the gas is quickly quenched to stop the reaction in a transfer line heat exchanger or inside a quenching header using quench oil. Steam cracking results in the slow deposition of coke, a form of carbon, on the reactor walls. Decoking requires the furnace to be isolated from the process and then a flow of steam or a steam/air mixture is passed through the furnace coils. This converts the hard solid carbon layer to carbon monoxide and carbon dioxide. Once this reaction is complete, the furnace is returned to service. The products produced by steam cracking depend on the composition of the feed, the hydrocarbon to steam ratio and on the cracking temperature and furnace residence time. Light hydrocarbon feeds such as ethane, propane, butane or light naphtha give product streams rich in the lighter polymer grade olefins, including ethylene, propylene, and butadiene. Heavier hydrocarbon (full range and heavy naphtha and gas oil fractions) also give products rich in aromatic hydrocarbons. To separate the different hydrocarbon compounds produced by steam cracking the cracked gas is subjected to a fractionation unit. Such fractionation units are well known in the art and may comprise a so-called gasoline fractionator where the heavy-distillate ("carbon black oil") and the middle-distillate ("cracked distillate") are separated from the light-distillate and the gases. In the subsequent optional quench tower, most of the light-distillate produced by steam cracking ("pyrolysis gasoline" or "pygas") may be separated from the gases by condensing the light-distillate. Subsequently, the gases may be subjected to multiple compression stages wherein the remainder of the light distillate may be separated from the gases between the compression stages. Also acid gases (CO2 and H2S) may be removed between compression stages. In a following step, the gases produced by pyrolysis may be partially condensed over stages of a cascade refrigeration system to about where only the hydrogen remains in the gaseous phase. The different hydrocarbon compounds may subsequently be separated by simple distillation, wherein the ethylene, propylene and C4 olefins are the most important high-value chemicals produced by steam cracking. The methane produced by steam cracking is generally used as fuel gas, the hydrogen may be separated and recycled to processes that consume hydrogen, such as hydrocracking processes. The acetylene produced by steam cracking preferably is selectively hydrogenated to ethylene. The alkanes comprised in the cracked gas may be recycled to the process for olefins synthesis.

The term "propane dehydrogenation unit" as used herein relates to a petrochemical process unit wherein a propane feedstream is converted into a product comprising propylene and hydrogen. Accordingly, the term "butane dehydrogenation unit" relates to a process unit for converting a butane feedstream into C4 olefins. Together, processes for the dehydrogenation of lower alkanes such as propane and butanes are described as lower alkane dehydrogenation process. Processes for the dehydrogenation of lower alkanes are well-known in the art and include oxidative dehydrogenation processes and non-oxidative dehydrogenation processes. In an oxidative dehydrogenation process, the process heat is provided by partial oxidation of the lower alkane(s) in the feed. In a non-oxidative dehydrogenation process, which is preferred in the context of the present invention, the process heat for the endothermic dehydrogenation reaction is provided by external heat sources such as hot flue gases obtained by burning of fuel gas or steam. In a non-oxidative dehydrogenation process the process conditions generally comprise a temperature of 540-700° C. and an absolute pressure of 25-500 kPa. For instance, the UOP Oleflex process allows for the dehydrogenation of propane to form propylene and of (iso)butane to form (iso)butylene (or mixtures thereof) in the presence of a catalyst containing platinum supported on alumina in a moving bed reactor; see e.g. U.S. Pat. No. 4,827,072. The Uhde STAR process allows for the dehydrogenation of propane to form propylene or of butane to form butylene in the presence of a promoted platinum catalyst supported on a zinc-alumina spinel; see e.g. U.S. Pat. No. 4,926,005. The STAR process has been recently improved by applying the principle of oxydehydrogenation. In a secondary adiabatic zone in the reactor part of the hydrogen from the intermediate product is selectively converted with added oxygen to form water. This shifts the thermodynamic equilibrium to higher conversion and achieves a higher yield. Also the external heat required for the endothermic dehydrogenation reaction is partly supplied by the exothermic hydrogen conversion. The Lummus Catofin process employs a number of fixed bed reactors operating on a cyclical basis. The catalyst is activated alumina impregnated with 18-20 wt-% chromium; see e.g. EP 0 192 059 A1 and GB 2 162 082 A. The Catofin process has the advantage that it is robust and capable of handling impurities which would poison a platinum catalyst. The products produced by a butane dehydrogenation process depends on the nature of the butane feed and the butane dehydrogenation process used. Also the Catofin process allows for the dehydrogenation of butane to form butylene; see e.g. U.S. Pat. No. 7,622,623.

The present invention will be discussed in the next Example which example should not be interpreted as limiting the scope of protection.

The sole FIGURE provides a schematic flow sheet of an embodiment of the present invention.

EXAMPLES

Figure 1:
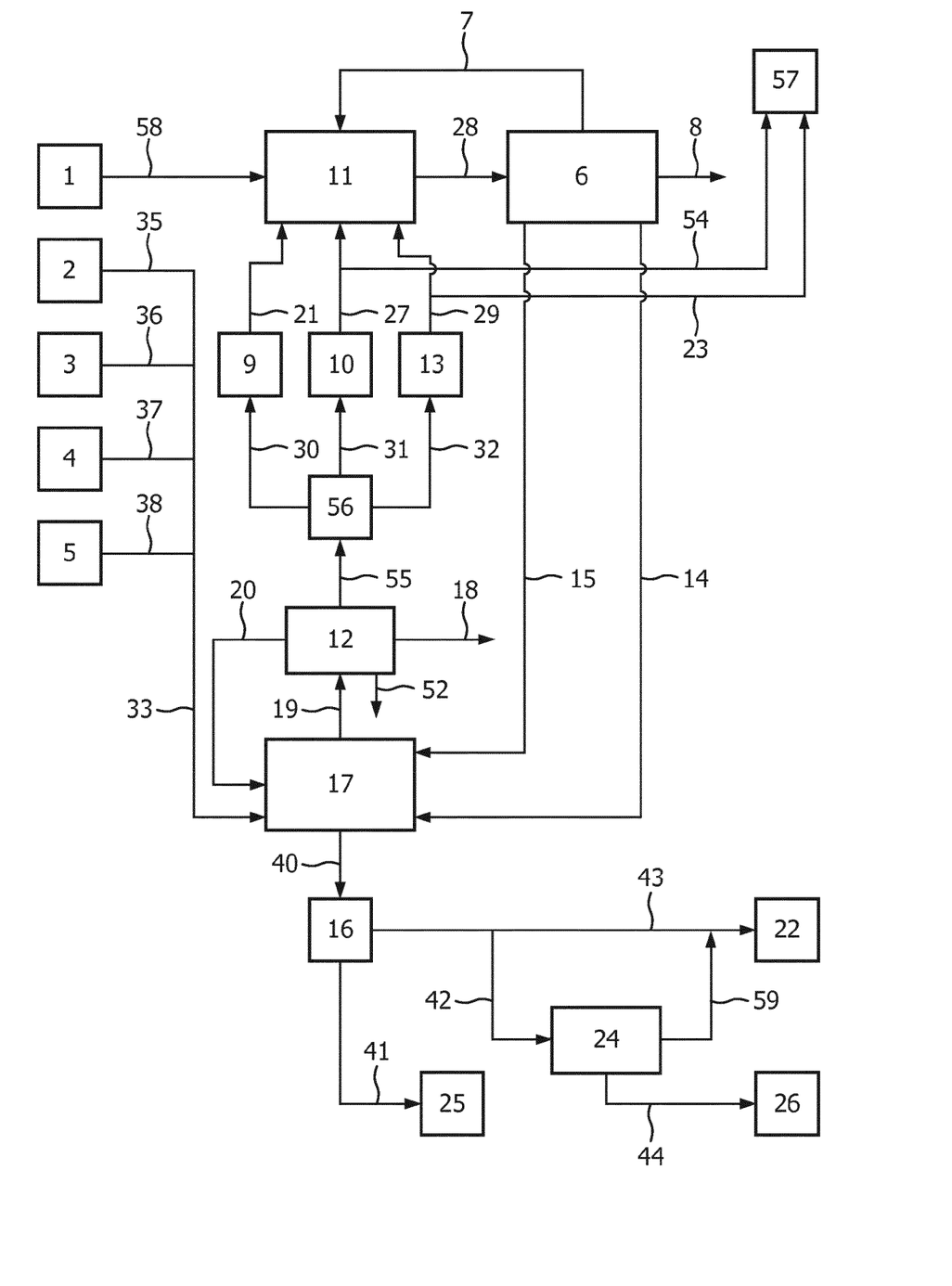

Feedstock 33, which can include different types of feedstock, for example naphtha 35, kerosene 36, diesel 37, atmospheric gas oil (AGO) 38 originating from tanks 2,3,4,5 respectively, is sent to a hydrocracker unit 17. In hydrocracking unit 17 a feedstock 33 is hydrocracked in the presence of hydrogen. The hydrocracking process results in the formation of a gaseous stream 19 comprising C2-C4 paraffins, hydrogen and methane and a high content aromatics stream 40. The gaseous stream 19 is sent to a separator 12, e.g. cryogenic distillation or solvent extraction, and separated into different streams, i.e. a stream 55 comprising C2-C4 paraffins, a stream 20 comprising hydrogen and methane and a purge stream 18. Stream 20 can be recycled to hydrocracking unit 17.

As mentioned before, stream 55 can be sent directly (not shown) to either a dehydrogenation unit 57 or directly (not shown) to a steam cracker unit 11. However, before sending stream 55 to steam cracker unit 11 it is preferred to carry out a separation on stream 55 first. In separator 56 the C2-C4 paraffins are separated into individual streams 30, 31 and 32. This means that stream 30 predominantly comprises C2 paraffins, stream 31 predominantly comprises C3 paraffins and stream 32 predominantly comprises C4 paraffins. If necessary, further separation of unwanted components or temperature adjustments can made in units 9, 10, 13. The individual streams 21, 27 and 29 will be sent to specific furnace sections of steam cracker unit 11. Although steam cracker unit 11 is shown as one single unit, in the present method it is to be understood that in a preferred embodiment steam cracker unit 11 comprises different furnace sections each dedicated for a specific chemical composition, that is a furnace section for C2, a furnace section for C3 and a furnace section for C4. In a preferred embodiment stream 27 predominantly comprising C3 paraffins and stream 29 predominantly comprising C4 paraffins are sent as stream 54 and stream 23 to dehydrogenation unit 57, respectively. In another embodiment it is possible to separate only C3 and C4 from stream 55 and to send a combined C3 and C4 stream to dehydrogenation unit 57.

In steam cracker unit 11 streams 21, 27 and 29 and a feedstock 58, for example C2 to C4 gases coming from an unit 1, are processed and its reaction products 28 are separated in a separation section 6. A C2-C6 alkanes comprising gas stream 7 is recycled to the steam cracker unit 11. Hydrogen 15 and pygas 14 can be sent to hydrocracking unit 17. The valuable product stream 8 comprising unsaturated hydrocarbons such as lighter alkenes including ethylene, propylene and butadienes is sent to further petrochemical processes. In case heavy hydrocarbons such as carbon black oil, cracked distillate and C9+ hydrocarbons are produced in steam cracker unit 11 these products can optionally be recycled to hydrocracking unit 17 as well.

High content aromatics stream 40 is sent to a separator 16, for example a distillation process, and separated into a stream 41 of heavy aromatics and a stream 43 high in mono-aromatics. Stream 42 which predominantly comprises C7 to C9 aromatics can converted in unit 24 into a benzene rich fraction 59 and a methane rich fraction 44.

The Example disclosed herein makes a distinction between a process (case 1) in which the naphtha is only processed through a steam cracker unit and a process (case 2) wherein the naphtha is sent to a hydrocracking unit, wherein in the gaseous stream thus formed the C2-C4 paraffins is separated and fed to the furnace section of a steam cracker unit. Case 1 is a comparative example and case 2 is an example according to the present invention.

The conditions for the steam cracker are as follows: Ethane and Propane furnaces: Coil Outlet temperature=845° C., Steam-to-oil-ratio=0.37, C4-furnaces: Coil Outlet temperature=820° C., Steam-to-oil-ratio=0.37, Liquid furnaces: Coil Outlet temperature=820° C., Steam-to-oil-ratio=0.37. Regarding the specific conditions for the Hydrocracking unit 17: The modeling was carried out for a hydrocracking reactor operating conditions: mean reactor temperature 510° C., Weight hour space velocity of 1 hr-1 and a reactor pressure of 1379 kPa gauge. The catalyst comprised a mixture of Pt supported on gamma alumina and HZSM-5 with a Si:Al ratio of 100:1.

The composition of the naphtha feed can be found in Table 1.

TABLE 1

Composition of naphtha as feedstock
Naphtha

| | | |
|---|---|---|
| n-Paraffins | wt-% | 36.7 |
| i-Paraffins | wt-% | 38.2 |
| Naphthenes | wt-% | 20.1 |
| Aromatics | wt-% | 5.0 |
| Density 60F | kg/L | 0.673 |
| IBP | ° C. | 37.8 |
| BP10 | ° C. | 45.7 |
| BP30 | ° C. | 49.5 |
| BP50 | ° C. | 54.7 |
| BP70 | ° C. | 64.0 |
| BP90 | ° C. | 79.4 |
| FBP | ° C. | 103.0 |

The battery product slate (wt. % of feed) for each of the case 1 and case 2 can be found in Table 2.

TABLE 2 battery product slate (wt. % of feed)

| Feed: naphtha | CASE 1 | CASE 2 |
|---|---|---|
| BATTERY LIMIT PRODUCT SLATE | SC | FHC + SC |
| H2 | 0.9 | 0.5 |
| CH4 | 17.9 | 18.3 |
| ETHYLENE | 35.1 | 50.1 |
| PROPYLENE | 19.3 | 12.8 |
| BUTADIENE | 5.3 | 2.0 |
| ISO-BUTENE | 3.3 | 0.3 |
| BENZENE | 9.1 | 8.3 |
| TX CUT | 3.4 | 7.0 |
| STYRENE | 0.9 | 0.1 |
| OTHER C7-C8 | 0.4 | 0.0 |
| C9 RESIN FEED | 0.7 | 0.0 |
| CD | 1.5 | 0.2 |
| CBO | 2.0 | 0.3 |
| % HIGH VALUE CHEMICALS | 76.9 | 80.5 |

From Table 2 one can see that treating the naphtha in a hydrocracking unit according to the present method (case 2) causes an increase of total BTX (benzene, toluene plus xylenes. Accordingly. the results disclosed in Table 2 show a considerable increase in BTX from case 1 (comparative example) to case 2 (according to the present invention). CD means cracked distillate and CBO means carbon black oil, respectively. Table 2 further illustrates that the yield of high value chemicals (ethylene+propylene+butadiene+isobutene, benzene, TX cut, Styrene and other C7-C8) is significantly higher when naphtha is processed according to the present invention (case 2) than can be achieved by conventional processing means (case 1).

Because in the hydrocracking unit (case 2) the heavier paraffins are all reduced to lighter components such as C2-C4 paraffins, the production of ethylene increases from 35 to 50% by pre-treating the naphtha in the hydrocracking unit. Thus case 2 provides a significantly higher ethylene yield than case 1.

Table 2 also shows that the production of heavier products (C9Resin feed, cracked distillate and carbon black oil) is reduced by pre-treating the naphtha in the hydrocracking unit (case 2). This means that according to the present method the formation of heavy unwanted byproducts can be reduced to a minimum.

Another example shows the influence of the operating temperature of a hydrocracking unit on the product slate. The catalyst mixture is a physical mixture of 2 gram ZSM-5 and 2 gram Pt on alumina catalyst, wherein 0.4-0.8 mm SiC chips have been incorporated in the catalyst bed to ensure good approximation to plug flow and reduce axial/radial temperature differences. Olefins6 naphtha was used as feedstock (see Table 3).

TABLE 3 composition of feed stock

| Carbon number | Naphthenes | i-Paraffins | n-Paraffins | Olefins | Aromatics | Total |
|---|---|---|---|---|---|---|
| 3 | <0.01 | <0.01 | <0.01 | <0.01 | <0.01 | <0.01 |
| 4 | <0.01 | 0.22 | 0.51 | 0.92 | <0.01 | 1.65 |
| 5 | 3.99 | 14.63 | 17.77 | 1.08 | <0.01 | 37.47 |
| 6 | 8.34 | 13.40 | 10.75 | 0.07 | 2.74 | 35.31 |
| 7 | 4.77 | 5.00 | 3.12 | <0.01 | 0.93 | 13.82 |
| 8 | 2.56 | 2.18 | 1.61 | <0.01 | 0.83 | 7.18 |
| 9 | 1.36 | 1.27 | 0.73 | <0.01 | 0.34 | 3.70 |
| 10 | <0.01 | 0.28 | 0.53 | <0.01 | <0.01 | 0.81 |
| 11 | <0.01 | <0.01 | 0.06 | <0.01 | <0.01 | 0.06 |
| Total | 21.03 | 36.98 | 35.08 | 2.07 | 4.85 | 100.00 |

In this example the temperature was varied between 425° C. and 500° C. (WHSV=1, H:HC=3, 200 psig). The effluent composition is shown in Table 4.

TABLE 4 effluent composition

| | 500° C. | 475° C. | 450° C. | 425° C. |
|---|---|---|---|---|
| Methane | 12.43 | 7.45 | 4.42 | 2.28 |
| LPG (C2-C4) | 72.66 | 78.50 | 80.29 | 78.10 |
| n-Paraffins (C5+) | 0.08 | 0.24 | 0.58 | 1.22 |
| i-Paraffins (C5+) | 0.02 | 0.06 | 0.24 | 1.03 |
| Olefins | <0.01 | <0.01 | <0.01 | <0.01 |
| Naphthenes | <0.01 | 0.04 | 0.43 | 0.43 |
| Aromatics | 14.81 | 12.23 | 9.98 | 9.98 |
| Total | 100 | 100 | 100 | 100 |

The data from Table 4 show that higher temperatures result in high methane (low value by-product) yields.

The invention claimed is:

1. A process for cracking a hydrocarbon feedstock, the method consisting of the steps of:
   feeding a liquid hydrocarbon feedstock to a hydrocracking unit,
   separating the stream thus hydrocracked in said hydrocracking unit into a high content aromatics stream and a gaseous stream comprising C2-C4 paraffins, hydrogen and methane,
   separating C2-C4 paraffins from said gaseous stream,
   further separating C2-C4 paraffins into individual streams, each stream predominantly comprising C2 paraffins, C3 paraffins and C4 paraffins, respectively, and
   feeding each individual stream to a specific furnace section of a steam cracker unit,
   wherein the process conditions in said hydrocracking unit are a temperature of 300-450° C., a pressure of 300-5000 kPa gauge and a Weight Hourly Space Velocity of 0.1-10 h−1;
   wherein separating said C2-C4 paraffins from said gaseous stream is carried out by solvent extraction;
   separating said high content aromatics stream into a stream of heavy aromatics and a stream high in mono-aromatics; and
   separating a C7 to C9 aromatics rich fraction from the stream high in mono-aromatics.

2. A process for cracking a hydrocarbon feedstock, the method consisting of the steps of:
   feeding a liquid hydrocarbon feedstock to a hydrocracking unit,
   separating the stream thus hydrocracked in said hydrocracking unit into a high content aromatics stream and a gaseous stream comprising C2-C4 paraffins, hydrogen and methane,
   separating C2-C4 paraffins from said gaseous stream,
   further separating C2-C4 paraffins into individual streams, each stream predominantly comprising C2 paraffins, C3 paraffins and C4 paraffins, respectively, and
   feeding each individual stream to a specific furnace section of a steam cracker unit,
   wherein the process conditions in said hydrocracking unit are a temperature of 300-450° C., a pressure of 300-5000 kPa gauge and a Weight Hourly Space Velocity of 0.1-10 h−1;
   wherein separating said C2-C4 paraffins from said gaseous stream is carried out by solvent extraction,
   wherein the reactor of the said hydrocracking unit is chosen from the group of an ebulating bed reactor and a slurry reactor; and
   separating said high content aromatics stream into a stream of heavy aromatics and a stream high in mono-aromatics; and
   separating a C7 to C9 aromatics rich fraction from the stream high in mono-aromatics, and converting said C7 to C9 aromatics rich fraction into a benzene rich fraction.

* * * * *